Aug. 9, 1927. I. L. FRIEDLAENDER Re. 16,698

VEHICLE SHIPPING JACK OR BRACKET

Original Filed Aug. 31, 1923 2 Sheets-Sheet 1

Inventor

Isador Leo Friedlaender

By S. E. Thomas

Attorney

Aug. 9, 1927. Re. 16,698
I. L. FRIEDLAENDER
VEHICLE SHIPPING JACK OR BRACKET
Original Filed Aug. 31, 1923 2 Sheets-Sheet 2
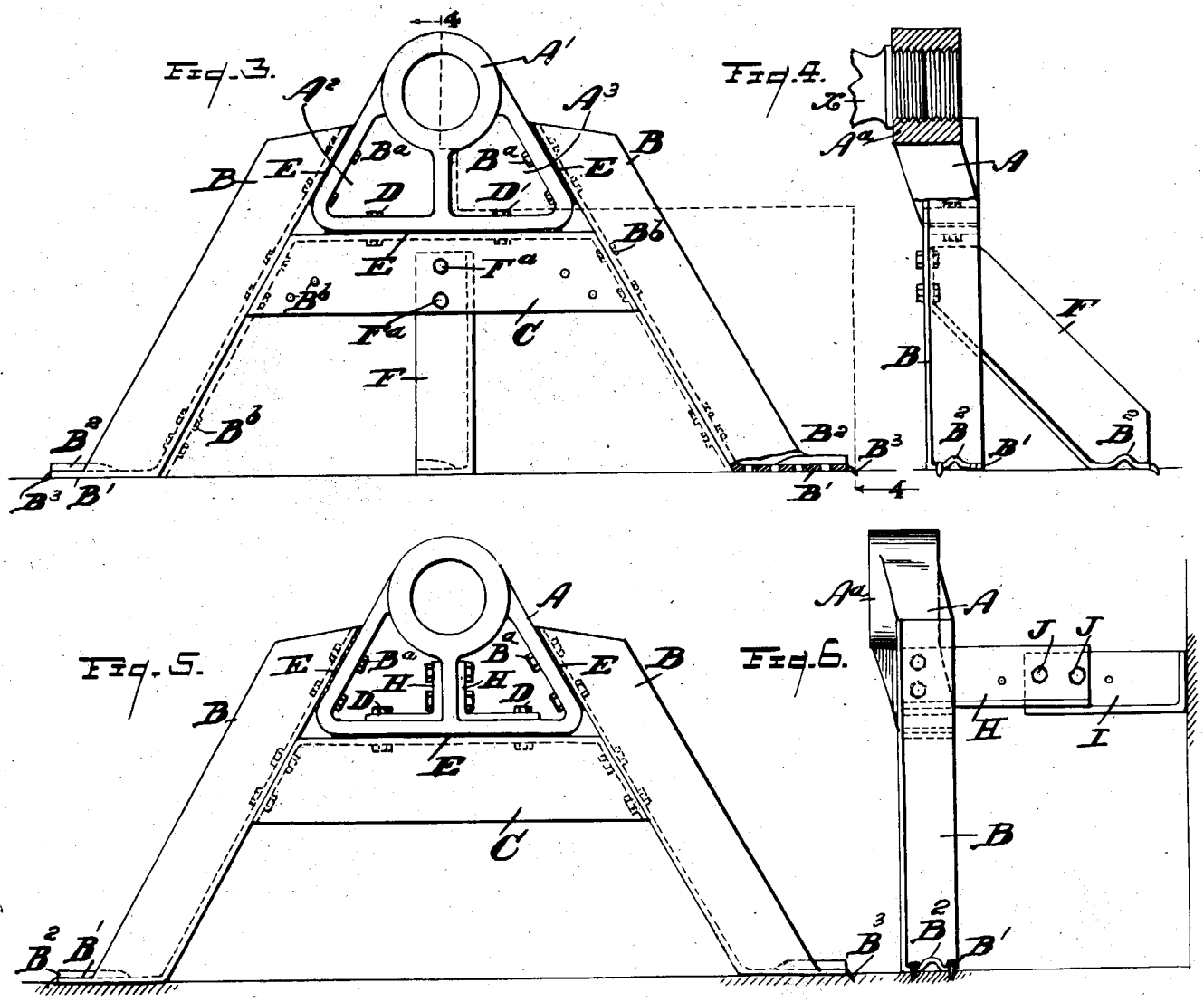
Inventor
Isador Leo Friedlaender
By S. E. Thomas
Attorney Reissued Aug. 9, 1927. Re. 16,698

UNITED STATES PATENT OFFICE.

ISADOR LEO FRIEDLAENDER, OF DETROIT, MICHIGAN.

VEHICLE SHIPPING JACK OR BRACKET.

Original No. 1,521,613, dated January 6, 1925, Serial No. 660,431, filed August 31, 1923. Application for reissue filed May 13, 1925. Serial No. 30,122.

My invention relates to an improvement in vehicle shipping jacks or brackets for freight cars, shown in the accompanying drawings and more particularly described in the following specification and claims.

This invention consists primarily in providing a fitting adapted to be screwed upon the wheel hubs, following the removal of the hub caps, or it may be screwed directly upon the axle of the vehicle upon removing the usual castellated nut screwed upon the ends of the axles.

A further object of the invention is to so construct the fitting that it may be adapted for engagement with a suitable framing to secure the vehicle either directly upon a freight car floor, or in an inclined or in a horizontally elevated position, so as to provide for shipping a plurality of automobiles directly upon the floor of the car and in an elevated position.

While the fitting screwed to the wheel hub or directly upon the ends of the axles may be of any suitable shape, a delta formation is preferred, this shape having advantages over other forms of construction as it may be readily attached to legs or like members of suitable length for supporting the vehicles one above the other.

A further advantage of the delta-shape is that it is adapted to act as a lever when screwing the fitting on or off the wheel hub or axle.

A further advantage of this form of construction is that when attached to extension legs or frames, nailed to the floor of the freight car, the frame is not apt to be strained to a breaking point in the event of the automobile jumping upward due to shocks occasioned by the movement of the freight car.

A further advantage of this form of construction is that the bracket and legs attached thereto and which are nailed to the floor of the car act as a brake on the automobile wheels to prevent the latter from moving or the wheels from turning—and even though the nails attaching the legs to the floor become loose the braking action of the device will not be affected.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 3 is an elevation of the device.

Figure 4 is a vertical cross-sectional view taken on or about line 4—4 of Figure 3 showing the device screwed upon the hub of a vehicle wheel, after the removal of the usual hub cap.

Figure 5 shows a pair of angle irons attached to the delta fitting for securing and bracing it to the side walls of a car, as employed in Figure 2.

Figure 6 is an end elevation of the device showing a pair of adjustable angle irons bolted to the fitting, as indicated in the preceding figure, for bracing the device to the side walls of the car.

Figures 1, 2, 7:
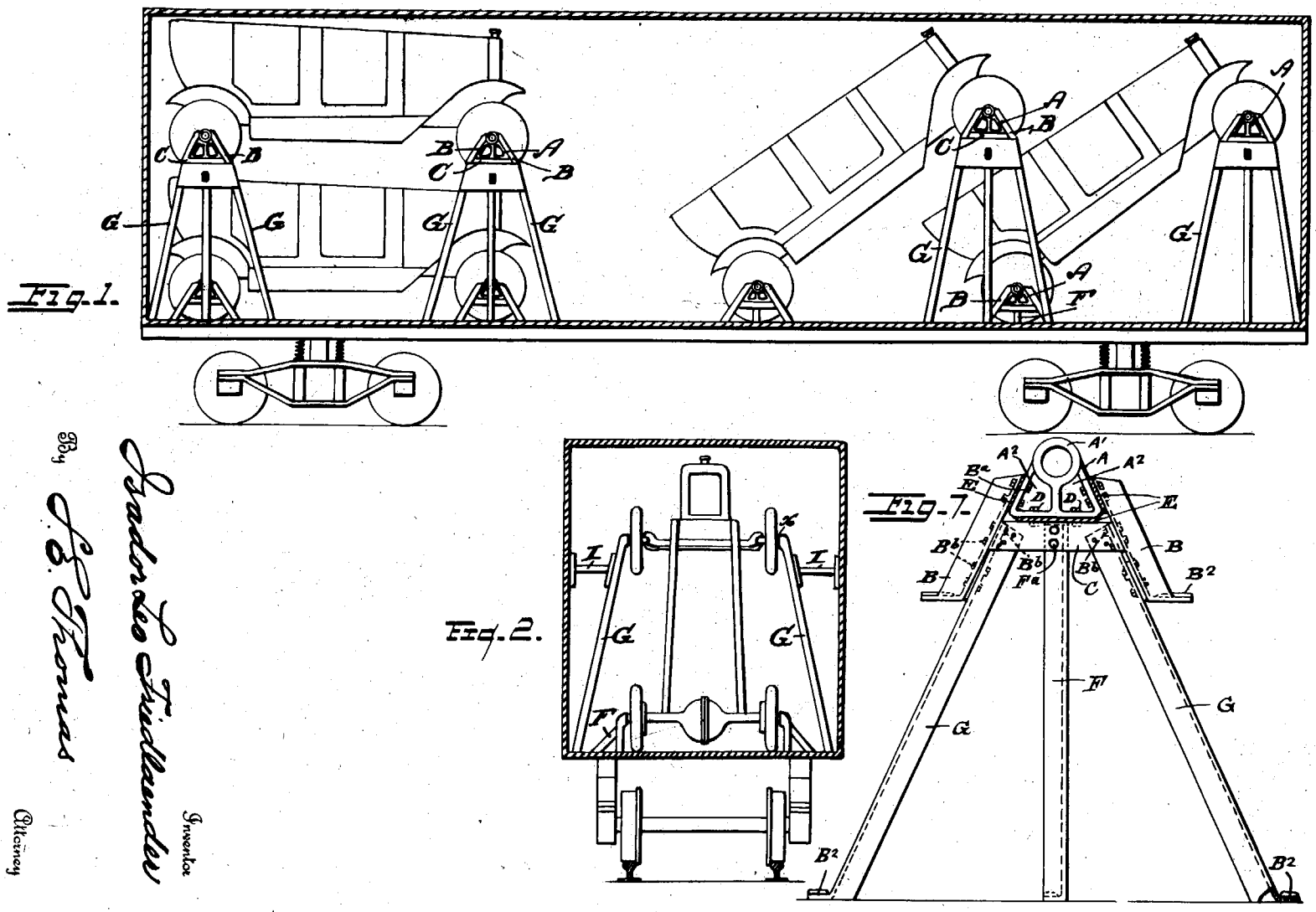
Figure 1 is a diagrammatic longitudinal vertical sectional view through a freight car showing my invention applied to the support of vehicles, one above the other, either in a horizontal position, or tilted at an angle to the floor of the car.
Figure 2 is a diagrammatic cross-sectional view through the freight car shown in Figure 1, indicating the manner of bracing a tilted vehicle to the side walls of the car.
Figure 7 is an elevation of the device to a suitable framing or the like, members being attached thereto to elevate the car above a vehicle supported beneath.

Referring now to the letters of reference placed upon the drawings:

A, indicates a fitting preferably delta-shaped, tapped to provide a hub $A^1$ to receive the threaded portion of a wheel hub X, upon the removal of the wheel cap—or upon the end of the vehicle axle upon removing the castellated nut therefrom. The delta-shaped fitting is adapted to be screwed into tight engagement with the shoulder at the inner end of the threaded portion of the hub and fitting frictionally engages the said shoulder and is thereby adapted to act as a brake to prevent rotation of the wheels. The said fitting is formed with openings $A^2$ and $A^3$ below the hub $A^1$ whereby to facilitate handling the fitting. The delta-shaped formation of the body and the openings therein provide for such leverage as to enable the operator to readily secure the fitting by hand onto or by hand remove it from the wheel hub or axle.

B, denotes supporting members or legs bolted to the side walls of the fitting—as indicated at $B^a$, the bolts passing into the respective openings $A^2$, $A^3$, and to the floor of a car through a suitable foot extension $B^1$, integral therewith. The extension $B^1$ is provided with a series of apertures for the passage of nails or bolts, whereby the legs are secured to the platform or floor of a freight car, and is preferably constructed with a raised portion $B^2$, between the nail apertures that a crowbar or like device may be readily inserted to pry the legs from the floor when it is desired to remove the device. The foot extension may also be constructed with a downwardly directed claw $B^3$ adapted to engage the floor of the car to assist in securing it against displacement.

C, designates a cross-member bolted to the side members for connecting the latter together and to serve as a support for the delta-shaped fitting bolted thereto as indicated at D, D.

E, E, E, indicate rubber shims, or other elastic strips, between the walls of the fitting and the supporting frame—the purpose of which is to absorb shocks due to transit which might otherwise be transmitted to the vehicle.

F, denotes a brace member, bolted as indicated at $F^a$ to the member C, and extending laterally therefrom at an angle to the floor, to which it is nailed through apertures provided in its foot piece.

It will be noted upon referring to Figure 6 that the tapped hub portion $A^a$ of the fitting projects beyond the vertical plane of the supporting legs in order that the latter will not interfere with the rim or tire of the vehicle wheel.

As shown in Figure 7,—extension legs G, may be bolted as at $B^b$ to the member C and also to the members B, B, of suitable length for supporting one vehicle above another located beneath, as diagrammatically indicated in Figure 1 of the drawings. If desired legs of suitable length may be attached directly to the delta-shaped fitting. I prefer however the construction shown in Figure 7, as this form is adapted for use in the lowermost position or by attachment of auxiliary legs to a more elevated position.

Figure 6 shows the manner of bracing the device to the side walls of a car, wherein angle irons H are bolted to each side of the central vertical web of the fitting, with apertures for the passage of bolts J to engage a T-iron or other member I, bolted to the side wall of the car; the several apertures providing for any adjustment that may be required to accommodate it to the width of the car.

As diagrammatically indicated in Figures 1 and 2, the vehicles may be mounted either in a horizontal plane, one above the other;— or they may be tilted at an angle to the floor of the car, their forward ends overlapping each other, as may be preferred.

It will be noted that the supporting legs or side members F, extend downwardly at an angle and thus brace the vehicle against lateral sway or strain.

While I have shown a delta-shaped fitting, it will be obvious that any other form may be employed in which provision is made to screw the fitting directly upon the wheel hub or axle of the vehicle. By so attaching the fitting to the vehicle it insures a rigid connection which will not loosen up through vibration or shock due to transit, and it also serves as a brake against the rotation of the wheels of the vehicle, thereby preventing damage to the tires, for even though the nails which secure the legs to the floor become loose the wheels cannot rotate. In the event of the tires deflating in transit, they will not become "rim cut" as the supporting jack will sustain the load of the car. As previously indicated, among other advantages the delta-shaped formation of the fitting eliminates the necessity of employing a wrench to screw the fitting on or off the vehicle hub or axle.

Having thus described my invention what I claim is:

1. In a device of the character described, a single unit fitting tapped to receive a screw threaded part of the vehicle and including combined attaching and operating members integral with said unit whereby to manipulate the unit for attaching the fitting to a support and the screw threaded part of the vehicle.

2. In a device of the character described, a single unit fitting tapped to receive a screw threaded part of the vehicle, supporting members attached to the side edges thereof, the said fitting being of such shape that the supporting members when attached thereto lie parallel therewith and diverge downwardly.

3. In a device of the character described; a single unit delta-shaped fitting tapped to receive a screw-threaded part of a vehicle, and a supporting element bolted to the horizontal lower edge of said fitting having inclined legs flush with and extending parallel to the inclined outside edges of the fitting, the lower ends of said legs being adapted for engagement with a floor or other support.

4. In a device of the character described; a single unit delta-shaped fitting having a projecting hub screw-tapped to receive a screw-threaded part of the vehicle and adapted to be screwed thereon without the use of a wrench and to operate as a brake, and means detachably secured to said delta-shaped fitting having divergent legs extending downwardly therefrom to a floor or other support.

5. In a device of the character described; a single unit delta-shaped fitting having an integral projecting hub screw-tapped to receive a screw-threaded part of the vehicle and to operate as a brake, and means bolted to said delta-shaped fitting having divergent legs extending downwardly therefrom to a floor or other support, the outer edge of said legs being parallel with and on the same plane with the lower extremity of the inclined outer edge of the delta-shaped fitting.

6. In a device of the character described; a single unit fitting having an integral portion tapped to receive a screw-threaded part of a vehicle and adapted to be screwed thereon without the use of a wrench and to operate as a brake; a supporting element bolted to the lower edge of said fitting; divergent legs extending downwardly to a floor or other support, and a brace secured to said supporting element adapted to cooperate with the legs to form a tripod.

7. In a device of the character described; a delta-shaped fitting having a hub screw-tapped to receive a screw-threaded part of the vehicle; a supporting frame including downwardly divergent legs with a horizontal portion connecting the divergent legs together at the top; said delta-shaped fitting supported upon and bolted to the horizontal portion of said supporting frame and means for securing the lower ends of said divergent legs to a floor or other support.

8. In a device of the character described; a delta-shaped fitting provided with a plurality of openings therethrough and with an integral hub screw-tapped to receive a screw-threaded part of a vehicle and capable of frictionally engaging the said screw threaded part to operate as a brake therefor and prevent rotary movement of the same, and means bolted through the outer sides of said openings of said fitting adapted to be secured to a support whereby to support the vehicle.

9. In a device of the character described, a delta-shaped fitting provided with a plurality of openings therethrough and with an integral hub screw-tapped to receive a screw-threaded part of a vehicle and capable of frictionally engaging the said screw threaded part to operate as a brake therefor and prevent rotary movement of the same, downwardly diverging legs having their upper ends disposed against said fitting and bolts passed through the upper ends of the legs and through the adjacent sides of the fitting and into the respective openings of the latter whereby to secure the legs and fitting together.

10. In a device of the character described, a delta-shaped fitting provided with a plurality of openings therethrough and with a hub screw-tapped to receive a screw-threaded part of the vehicle, downwardly diverging legs having their upper ends disposed against said fitting, bolts passed through the upper ends of the legs and through the adjacent sides of the fitting and into the respective openings of the latter whereby to secure the legs and fitting together, and a cross piece lying immediately beneath the under side of said fitting and secured thereto and connecting and secured to said legs.

11. In a device of the character described, a delta-shaped fitting provided with a plurality of openings therethrough and with a hub screw-tapped to receive a screw-threaded part of a vehicle, downwardly diverging legs having their upper ends disposed against said fitting, bolts passed through the upper ends of the legs and through the adjacent sides of the fitting and into the respective openings of the latter whereby to secure the legs and fitting together, and a cross piece lying immediately beneath the underside of said fitting and secured thereto and connecting and secured to said legs, and a brace secured to said cross piece to cooperate with the legs to form a tripod.

12. In a device of the character described, a delta-shaped fitting provided with a projecting hub tapped to receive a screw-threaded part of a vehicle, a suitable A-shaped framework bolted to the angular walls of the fitting, elastic shims located between the framework and the angular walls of the fitting, and a brace member bolted to the horizontal member of the A-shaped frame adapted to co-operate with the legs of the A-shaped frame in forming a tripod.

13. In a device of the character described, a single unit fitting tapped to receive a screw threaded part of the vehicle and provided with openings adjacent the screw threaded part whereby to facilitate manipulation of the unit for attaching the fitting to a support and to the screw threaded part of the vehicle.

In testimony whereof, I sign this specification.

ISADOR LEO FRIEDLAENDER.